(12) United States Patent
Liao (10) Patent No.: US 7,069,842 B1
(45) Date of Patent: Jul. 4, 2006

(54) BARBECUE GRILL HAVING ROTATABLE TOOLS

(76) Inventor: Shun I Liao, P.O. Box 63-298, Taichung, 40699 (TW)

( * ) Notice: Subject to any disclaimer, the term of this patent is extended or adjusted under 35 U.S.C. 154(b) by 34 days.

(21) Appl. No.: 11/026,747

(22) Filed: Jan. 3, 2005

(51) Int. Cl.
*A47J 37/00* (2006.01)

(52) U.S. Cl. .......... 99/421 A; 99/419; 99/420

(58) Field of Classification Search .......... 99/326–333, 99/339, 340, 400, 401, 419–421 V, 426, 427, 99/444–450, 451, 473–476; 126/41 R, 25 R, 126/9 R, 9 A; 219/400, 401, 385, 386
See application file for complete search history.

(56) References Cited

U.S. PATENT DOCUMENTS

| | | | | |
|---|---|---|---|---|
| 2,939,384 A * | 5/1960 | Laurell | .................. | 99/421 HH |
| 3,323,443 A | 6/1967 | Schulze | | |
| 3,331,307 A * | 7/1967 | Hoffert | .................. | 99/339 |
| 3,848,523 A * | 11/1974 | Galisz et al. | .................. | 99/421 H |
| 3,866,527 A * | 2/1975 | Katris | .................. | 99/421 H |
| 5,001,971 A * | 3/1991 | Beller | .................. | 99/421 H |
| 5,007,403 A * | 4/1991 | Chen | .................. | 126/25 R |
| 5,168,798 A * | 12/1992 | Kristofich et al. | .................. | 99/421 H |
| 5,172,628 A * | 12/1992 | Pillsbury et al. | .................. | 99/421 H |
| 5,586,490 A * | 12/1996 | Saman | .................. | 99/421 R |
| 5,669,290 A * | 9/1997 | Natsumi et al. | .................. | 99/421 H |
| 5,715,744 A * | 2/1998 | Coutant | .................. | 99/421 H |
| 5,720,217 A * | 2/1998 | Pappas | .................. | 99/421 H |
| 5,960,706 A * | 10/1999 | Cheng | .................. | 99/421 H |
| 5,970,971 A | 10/1999 | Wu | .................. | 126/38 |
| 6,810,792 B1 | 11/2004 | Knight | .................. | 99/340 |

* cited by examiner

Primary Examiner—Timothy F. Simone (57) ABSTRACT

A barbecue grill device includes a container and a housing disposed on a base, a platter attached to the housing for supporting a heat source, a shaft rotatably attached to the container, and a motor driving member for driving the shaft to rotate relative to the container. One or more axles are rotatably attached to the container and engaged with the shaft, so as to be rotated by the motor driving member via the shaft. One or more barbecue tools may be used for supporting food to be barbecued, and each includes a mandrel attached to the axle, so as to be rotated by the motor driving member via the shaft and the axle. An air circulating device may be used to discharge smoke.

11 Claims, 10 Drawing Sheets

BARBECUE GRILL HAVING ROTATABLE TOOLS

BACKGROUND OF THE INVENTION

1. Field of the Invention

The present invention relates to a barbecue grill device, and more particularly to a barbecue grill device having rotatable barbecue tools drivable by motor driving members.

2. Description of the Prior Art

Typical barbecue grill devices comprise a receptacle to receive heat sources, such as charcoals therein, and a grate or rack disposed on top of the receptacle, to support food to be heated or barbecued with the heat sources.

For example, U.S. Pat. No. 3,323,443 to Schulze discloses one of the typical portable grills comprising a rack including a lower grate disposed on top of a receptacle, and an upper grate pivotally attached or coupled to the lower grate, to clamp and to support the meat or food to be heated or barbecued with the heat sources.

Normally, the food should be turned up-side-down frequently by users themselves to have both sides of the food to be suitably heated or barbecued, and to prevent the food from being over-heated or over-barbecued. The grates of the rack and thus the food may not be rotated or turned up-side-down with motor driving members automatically.

U.S. Pat. No. 5,970,971 to Wu discloses another typical foldable barbecue device comprising a gas stove disposed in a housing, and a grill disposed on top of the housing to support the food to be heated or barbecued with the gas stove. However, similarly, the food should also be turned up-side-down frequently by users themselves to have both sides of the food to be suitably heated or barbecued, and also may not be turned up-side-down with motor driving members automatically.

U.S. Pat. No. 6,810,792 to Knight discloses a further typical barbecue oven device comprising a rotatable food rack including a rotisserie wheel rotatably disposed in a cooking chamber of the oven with a shaft. The food rack may include rotating spits, shelves, baskets, etc. rotatably supported within the cooking chamber of the oven. However, the food is rotatably supported and moved within the cooking chamber of the oven, and may not be turned up-side-down, such that the food may not be suitably heated or barbecued.

In addition, for receiving the rotatable food rack, the oven should include or provide a huge cooking chamber to receive the rotatable food rack and the food therein, such that the typical barbecue oven device may not be easily carried with the users.

The present invention has arisen to mitigate and/or obviate the afore-described disadvantages of the conventional barbecue grill devices.

SUMMARY OF THE INVENTION

The primary objective of the present invention is to provide a barbecue grill device including rotatable barbecue tools drivable by motor driving members, to turn the food relative to the heat source automatically with motor driving members, and thus to allow the food to be suitably heated or barbecued.

In accordance with one aspect of the invention, there is provided a barbecue grill device comprising a base, a container disposed on the base, and including a chamber formed therein, at least one housing disposed on the base, and including two side fences, a platter attached to the housing, for supporting a heat source therein, a shaft rotatably attached to the container, a motor driving member for driving the shaft to rotate relative to the container, at least one axle rotatably attached to the container and engaged with the shaft, so as to be rotated by the motor driving member via the shaft, and a barbecue tool for supporting food to be barbecued, the barbecue tool including a mandrel attached to the axle, so as to be rotated by the motor driving member via the shaft and the axle.

The housing includes two side fences, and a rack secured between the side fences, for engaging with and for supporting the barbecue tool. The housing includes one or more rails attached to each of the side fences thereof, for slidably and adjustably supporting the platter.

The shaft includes at least one bevel gear attached thereto, the axle includes a bevel gear attached thereto and engaged with the bevel gear of the shaft, to allow the axle to be rotated and driven by the motor driving member via the shaft.

The container includes an air circulating device having a casing disposed on top of the container, and the casing includes a number of openings formed therein, for smoke discharging purposes.

The container includes a hood attached thereto, for shielding the barbecue tool and the food. The hood includes a heat source attached thereto, for barbecuing the food. The shaft includes an extension extended out of the container, and a grate attached to the extension of the shaft, and rotated in concert with the shaft, for supporting the food.

The barbecue tool includes a handle attached to the mandrel. The barbecue tool includes a recess formed in the mandrel thereof, the handle includes a passage formed therein to receive the mandrel, and includes a screw hole formed therein and communicating with the passage thereof, and a fastener threaded with the screw hole of the handle, and engageable with the recess of the mandrel, to secure the handle to the mandrel.

The fastener includes a stud extended therefrom, for engaging into the recess of the mandrel. The handle includes a slot formed therein and communicating with the passage thereof, and a bracket secured to the handle with the fastener and having an arm extended therefrom, and engageable through the slot of the handle and engageable into the recess of the mandrel, to secure and couple the handle to the mandrel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
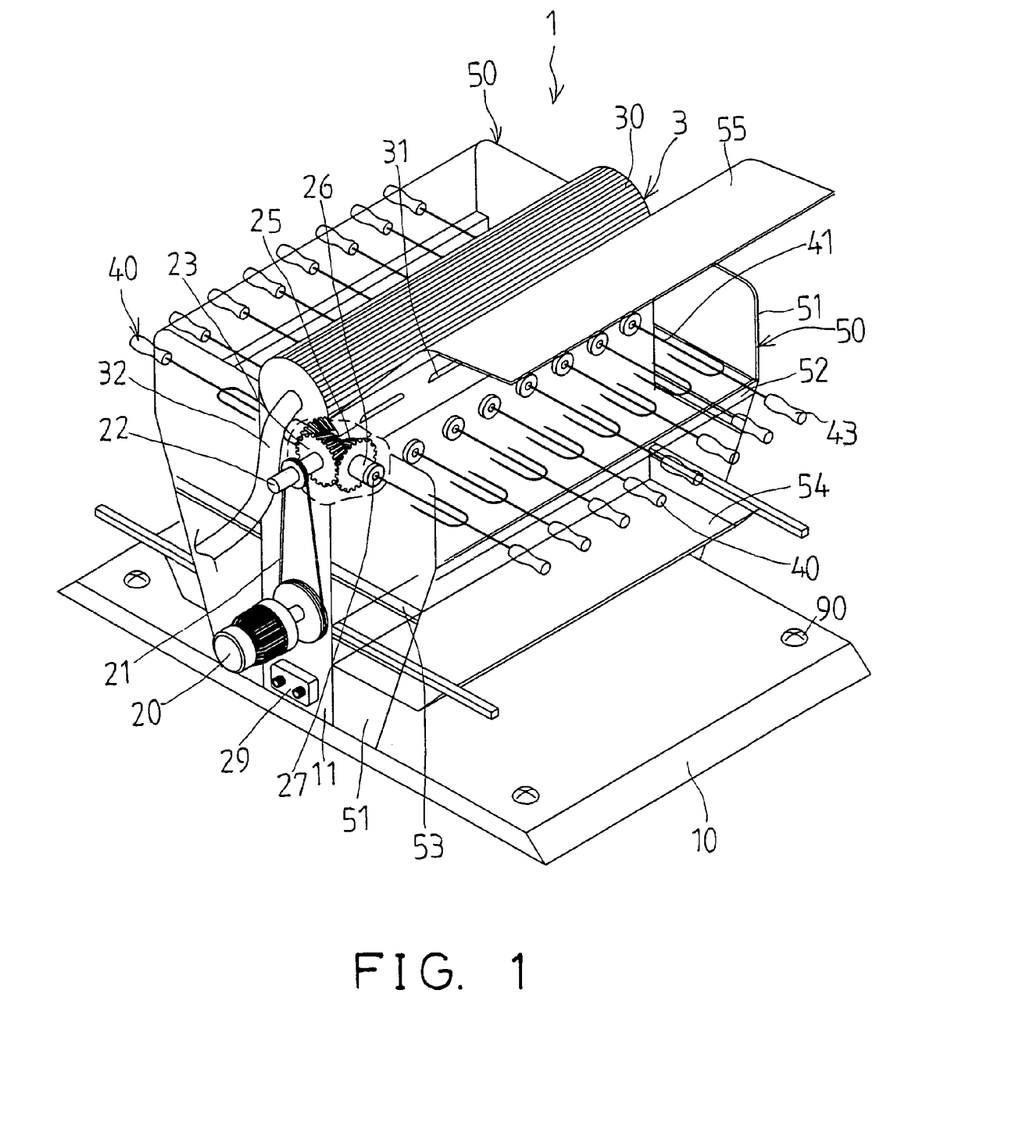
FIG. 1 is a perspective view of a barbecue grill device in accordance with the present invention.
Figure 2:
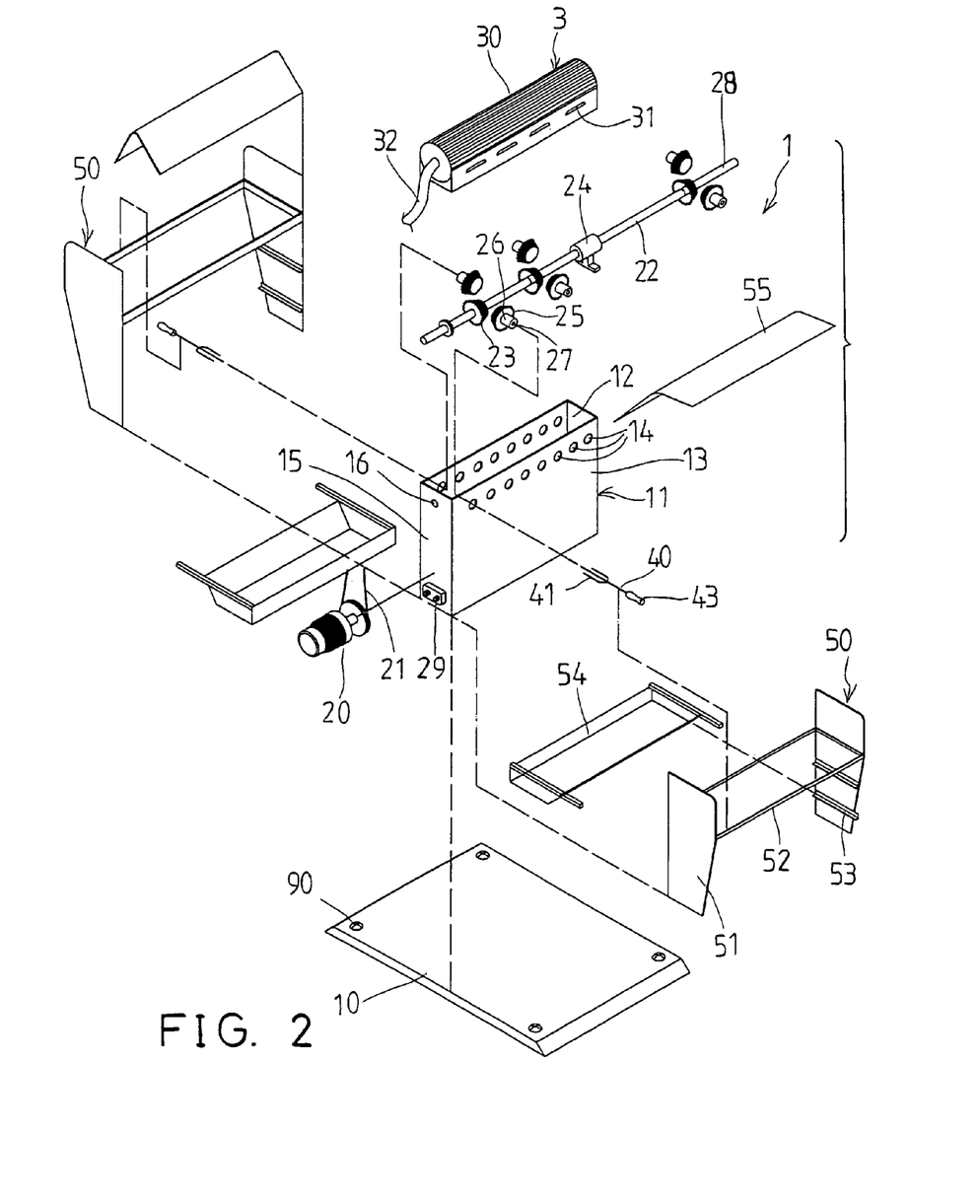
FIG. 2 is an exploded view of the barbecue grill device.
Figure 3:
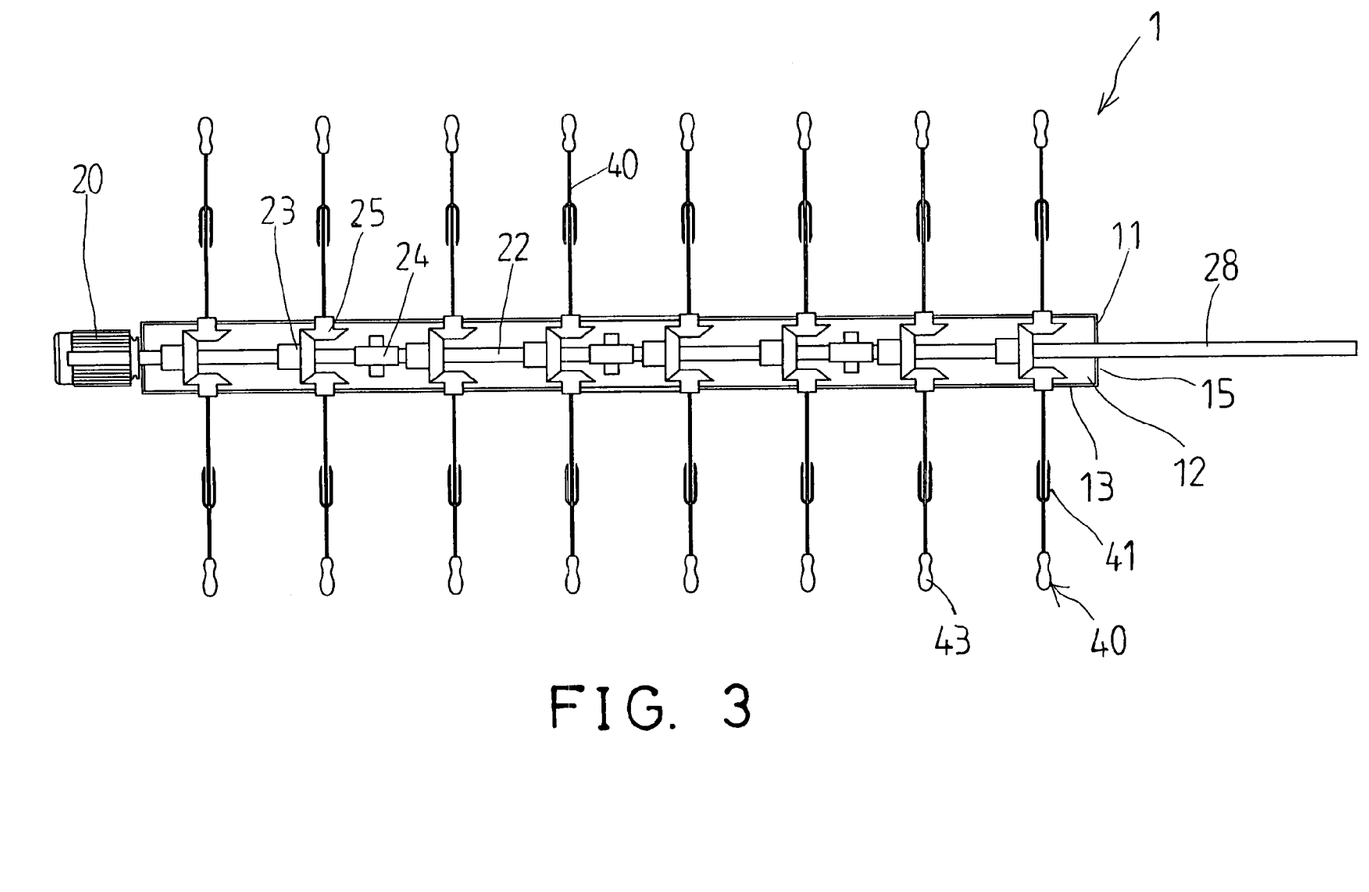
FIG. 3 is a partial top plan view of the barbecue grill device.
Figure 4:
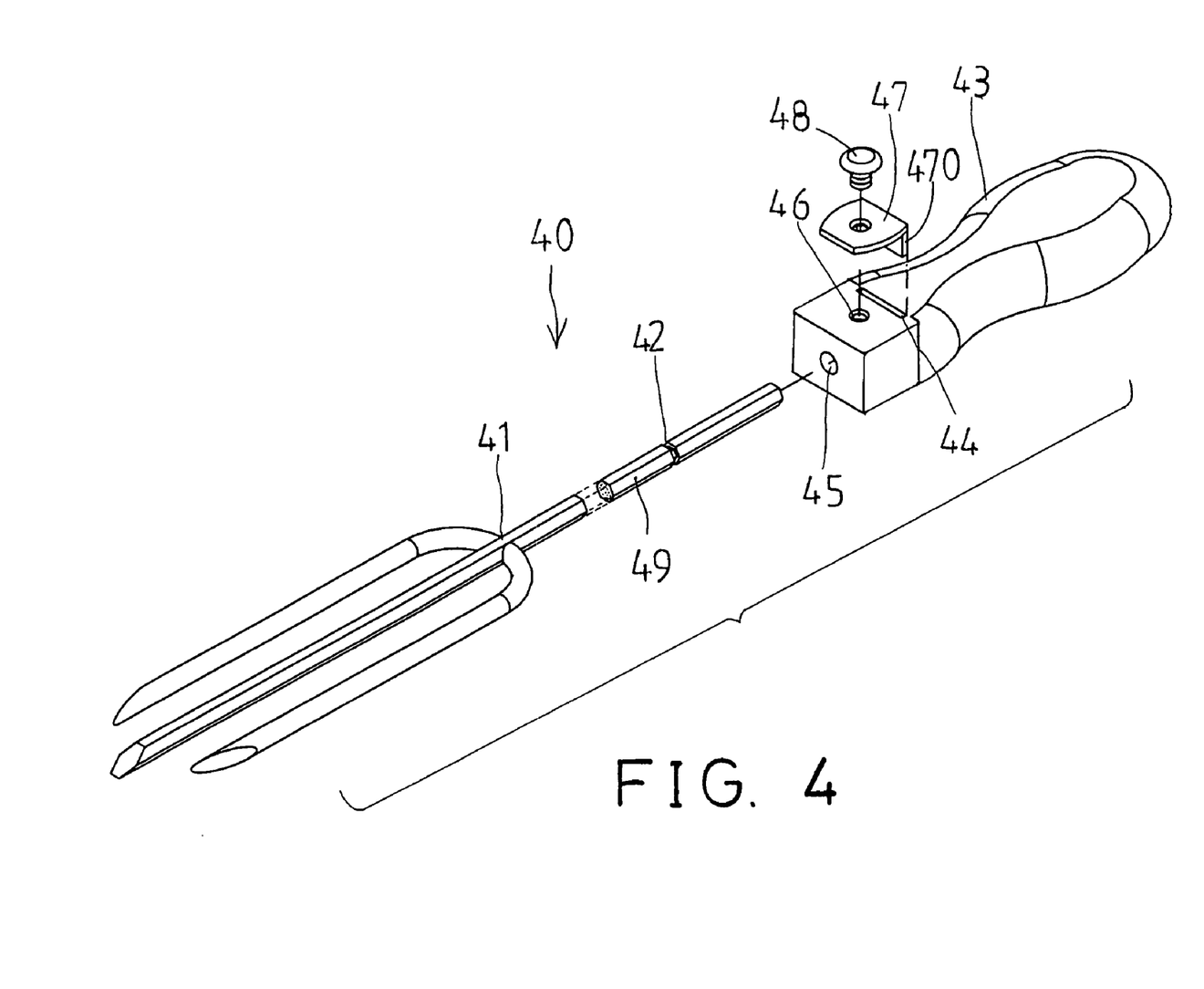
FIG. 4 is a partial exploded view illustrating one of the barbecue tools of the barbecue grill device.
Figure 5:
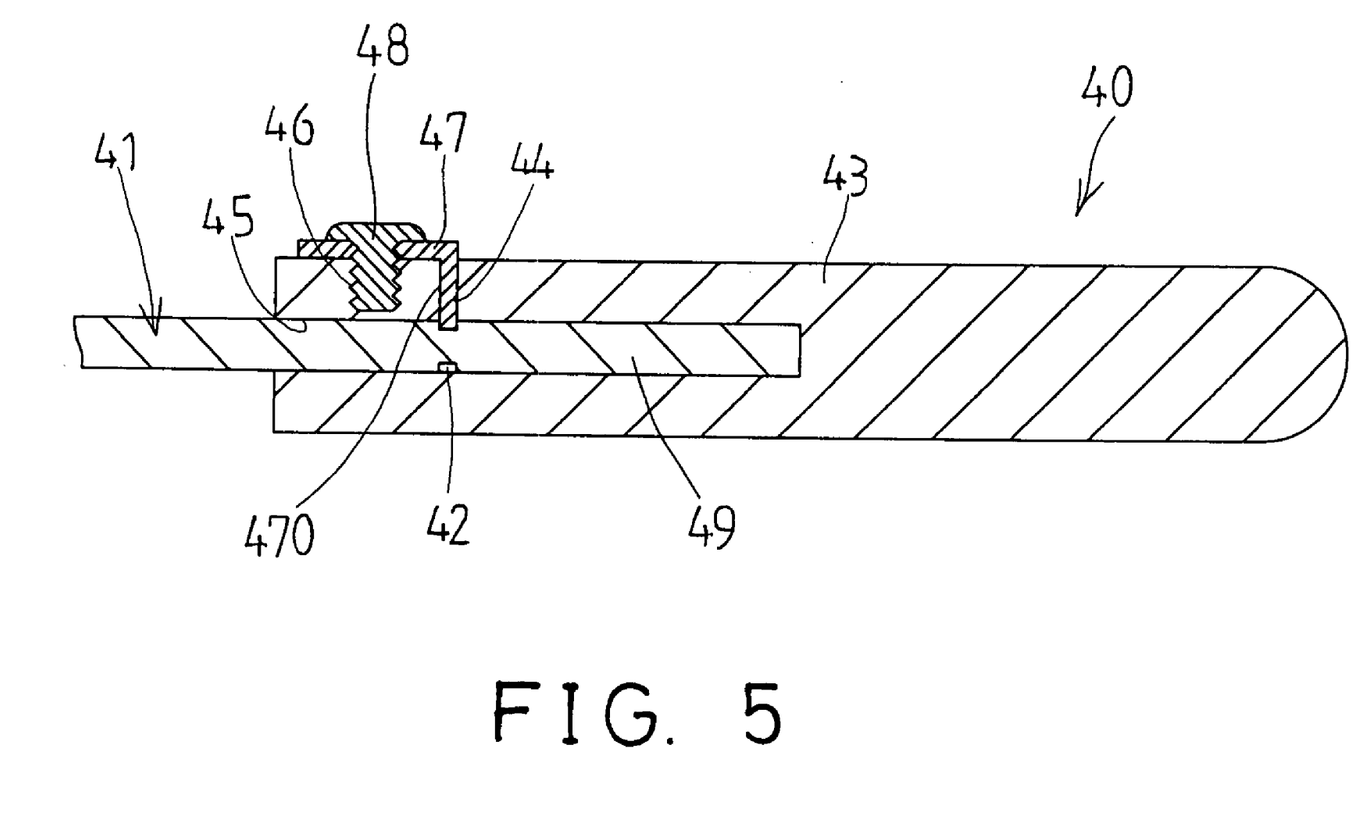
FIG. 5 is a partial cross sectional view of the barbecue tool of the barbecue grill device.
Figures 6, 7:
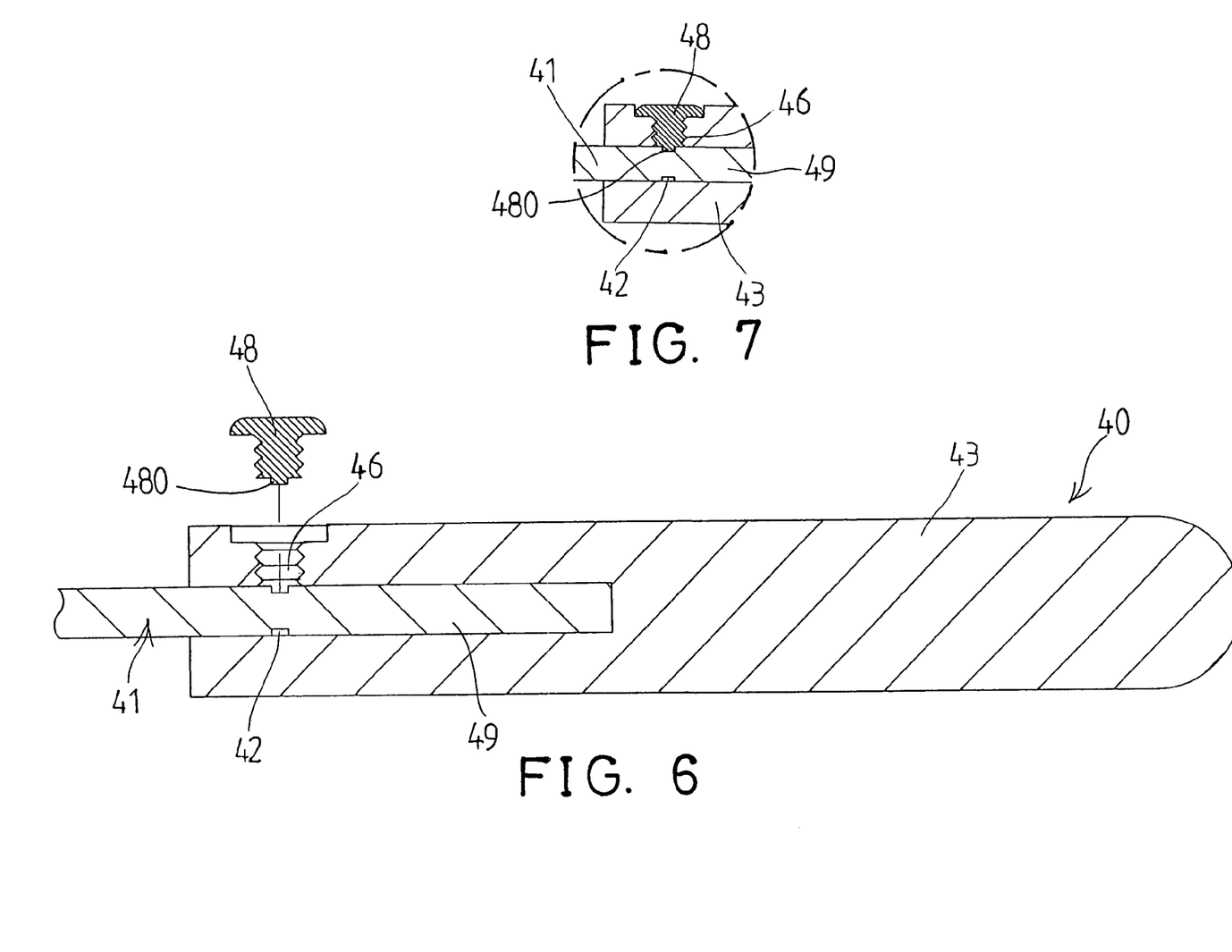
FIG. 6 is a partial exploded and cross sectional view of the barbecue tool of the barbecue grill device, illustrating the other arrangement of the barbecue grill device.
FIG. 7 is an enlarged partial cross sectional view of the barbecue tool of the barbecue grill device.

Referring to the drawings, and initially to FIGS. 1–3, a barbecue grill device 1 in accordance with the present invention comprises a base 10 for attaching or securing onto various supporting objects (not shown) with such as fasteners 90, and a container 11 disposed or supported on the base 10 by such as fasteners, adhesive materials, or by welding processes. The container 11 includes a chamber 12 formed therein and defined between two side walls 13 and two end walls 15, each of the side walls 13 includes a number of orifices 14 formed therein, and each of the end walls 15 further includes an aperture 16 formed therein.

A shaft 22 is rotatably engaged through the apertures 16 of the end walls 15 of the container 11, and is coupled to a motor or motor driving member 20 with a coupling device 21, such as a sprocket and chain coupling device 21, a gearing coupling device 21, a pulley and belt coupling device 21, or the like, to allow the shaft 22 to be rotated or driven by the motor 20. The motor 20 may be attached to the container 11 with such as fasteners. The shaft 22 includes a number of coupler members 23, such as bevel gears 23 disposed thereon.

One or more collars or bearings 24 may further be provided and disposed in the chamber 12 of the container 11, and engaged onto the shaft 22, to stably and rotatably support the shaft 22 on the container 11. A number of axles 26 are rotatably engaged in the orifices 14 of the side walls 13 of the container 11 respectively, and each includes another coupler member or bevel gear 25 disposed thereon, and engaged with the bevel gears 23 of the shaft 22 respectively, to allow the axles 26 to be rotated by the motor 20 via the shaft 22.

The axles 26 may each include a cavity 27 formed therein. The shaft 22 may include an extension 28 extended out of the container 11. A vacuum or smoke exhausting or air circulating device 3 may further be provided and includes a casing 30 disposed on top of the container 11, and having a number of openings 31 formed therein, and coupled to such as a fan device (not shown) with an electric cable 32, to draw and to discharge smoke, and to prevent users from being annoyed or disturbed by the smoke.

A number of barbecue tools 40 may be provided to support the food to be heated or barbecued with the barbecue grill device 1, and each includes a fork 41 engageable with the cavities 27 of the axles 26, to allow the tools 40 to be rotated or driven by the motor 20 via the shaft 22 and the bevel gears 23, 25 and the axles 26, and thus to allow the food supported on the tools 40 also to be rotated or driven by the motor 20, such that the food supported on the rotatable tools 40 may be suitably heated or barbecued.

For example, as shown in FIGS. 4–7, the barbecue tools 40 each includes a peripheral recess 42 formed in a mandrel 49 of the fork 41 thereof, in which the mandrel 49 has one end engaged with the cavities 27 of the axles 26, to allow the forks 41 of the tools 40 to be rotated or driven by the motor 20 via the shaft 22 and the bevel gears 23, 25 and the axles 26. A handle 43 includes a passage 45 formed therein to receive the other end of the fork 41, and includes a slot 44 and a screw hole 46 formed therein and communicating with the passage 45 thereof.

A fastener 48 may be directly threaded with the screw hole 46 of the handle 43 (FIGS. 6, 7), and may include a stud 480 extended therefrom, for engaging into the peripheral recess 42 of the mandrel 49 of the fork 41, and thus for securing and coupling the handle 43 to the mandrel 49 of the fork 41. A bracket 47 may further be provided and secured to the handle 43 with the fastener 48 (FIGS. 4, 5), and may include an arm 470 extended therefrom, and engageable through the slot 44 of the handle 43 (FIG. 5), and also engageable into the peripheral recess 42 of the mandrel 49 of the fork 41, to selectively secure and couple the handle 43 to the mandrel 49 of the fork 41.

In operation, the forks 41 of the barbecue tools 40 may be engaged through the food to be heated or barbecued with the barbecue grill device 1, and may be engaged with or attached to the axles 26, to allow the tools 40 and thus the food to be rotated or driven by the motor 20, and thus to allow the food supported on the rotatable tools 40 to be suitably or evenly heated or barbecued. A switch 29 may be attached to the container 11, and coupled to the motor driving member 20, to control or to operate the motor driving member 20.

The barbecue grill device 1 further includes one or more, such as two housings 50 disposed or supported on the base 10 and/or secured to the container 11 by such as fasteners, adhesive materials, or by welding processes. The housings 50 each includes two side fences 51, and a rack 52 secured between the side fences 51, to couple the side fences 51 together, and to reinforce the side fences 51. It is preferable that the rack 52 may be engaged with the rotatable barbecue tools 40 (FIGS. 1, 8), to stably support the barbecue tools 40 and thus the food in place.

Figure 8:
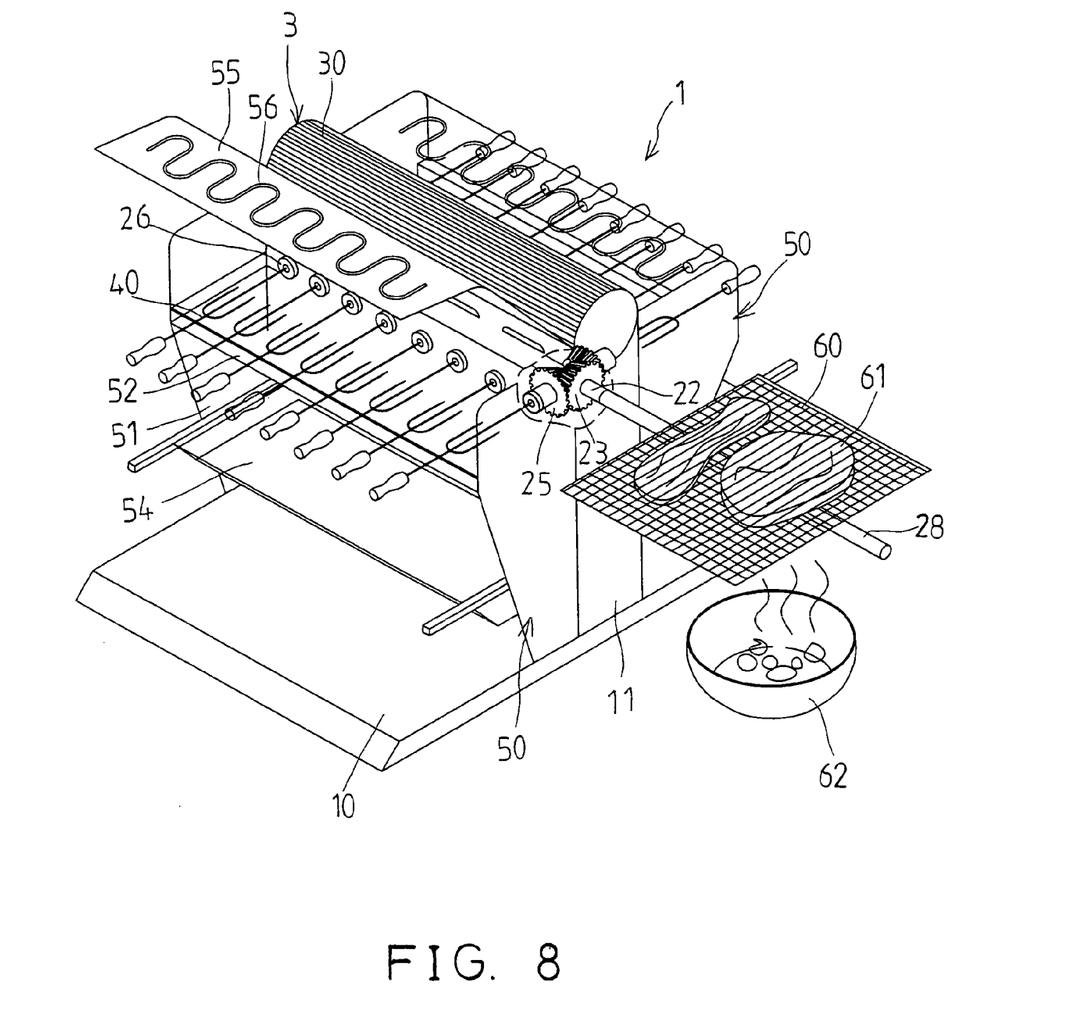
FIG. 8 is a perspective view illustrating the operation of the barbecue grill device.

The housings 50 each includes one or more rails 53 attached to the side fences 51 thereof, for slidably and adjustably supporting a platter 54 which may be used to support a heat source therein, such as charcoals, a gas stove (not shown), or an electric stove (not shown), or the like. The platter 54 may be adjustably attached to either of the rails 53, to adjust the distance between the heat source and the food, and to suitably heat the food.

As shown in FIGS. 1–2 and 8–9, a hood 55 may be attached to the housing 50, or to the casing 30 of the air circulating device 3, or to the container 11, to cover or to shield the food and the barbecue tools 40, and to allow the smoke to be suitably drawn out by the air circulating device 3. As shown in FIG. 8, the hood 55 may further include another heat source 56 attached thereto, such as a gas stove (not shown), or an electric heating device 56, to barbecue the food from top thereof.

As shown in FIG. 8, a grill or a grate 60 may further be provided and attached or secured to the extension 28 of the shaft 22, and rotated in concert with the shaft 22, to support the food 61 thereon, and thus to allow the grate 60 and thus the food 61 to be rotated or driven by the motor 20, and to allow the food 61 to be suitably heated or barbecued. Another heat source 62, such as a charcoal platter 62, a gas stove (not shown), or an electric heating device (not shown) may further be provided and disposed below the extension 28 of the shaft 22.

Figure 9:
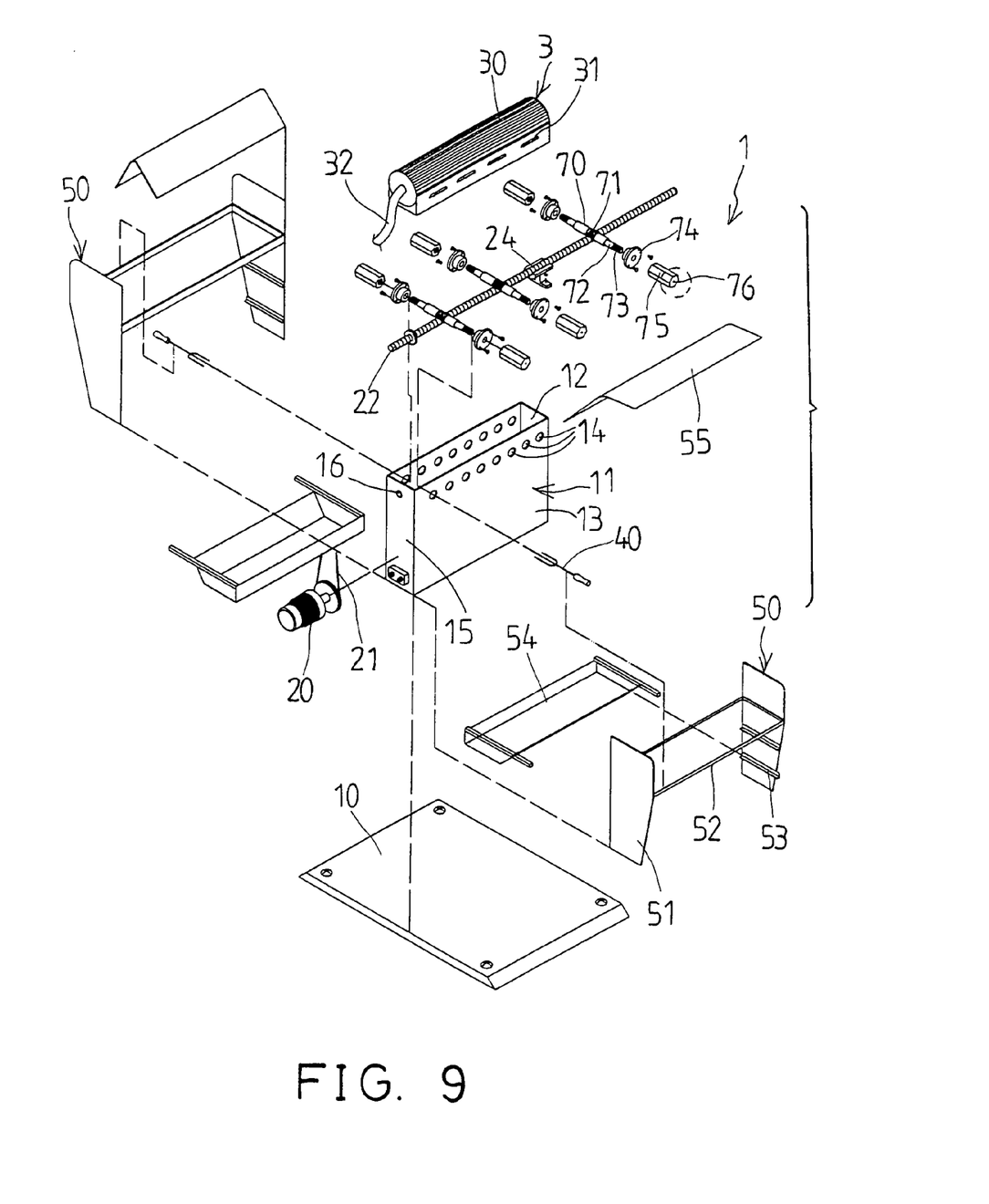
FIG. 9 is an exploded view illustrating the other embodiment of the barbecue grill device.
Figure 10:
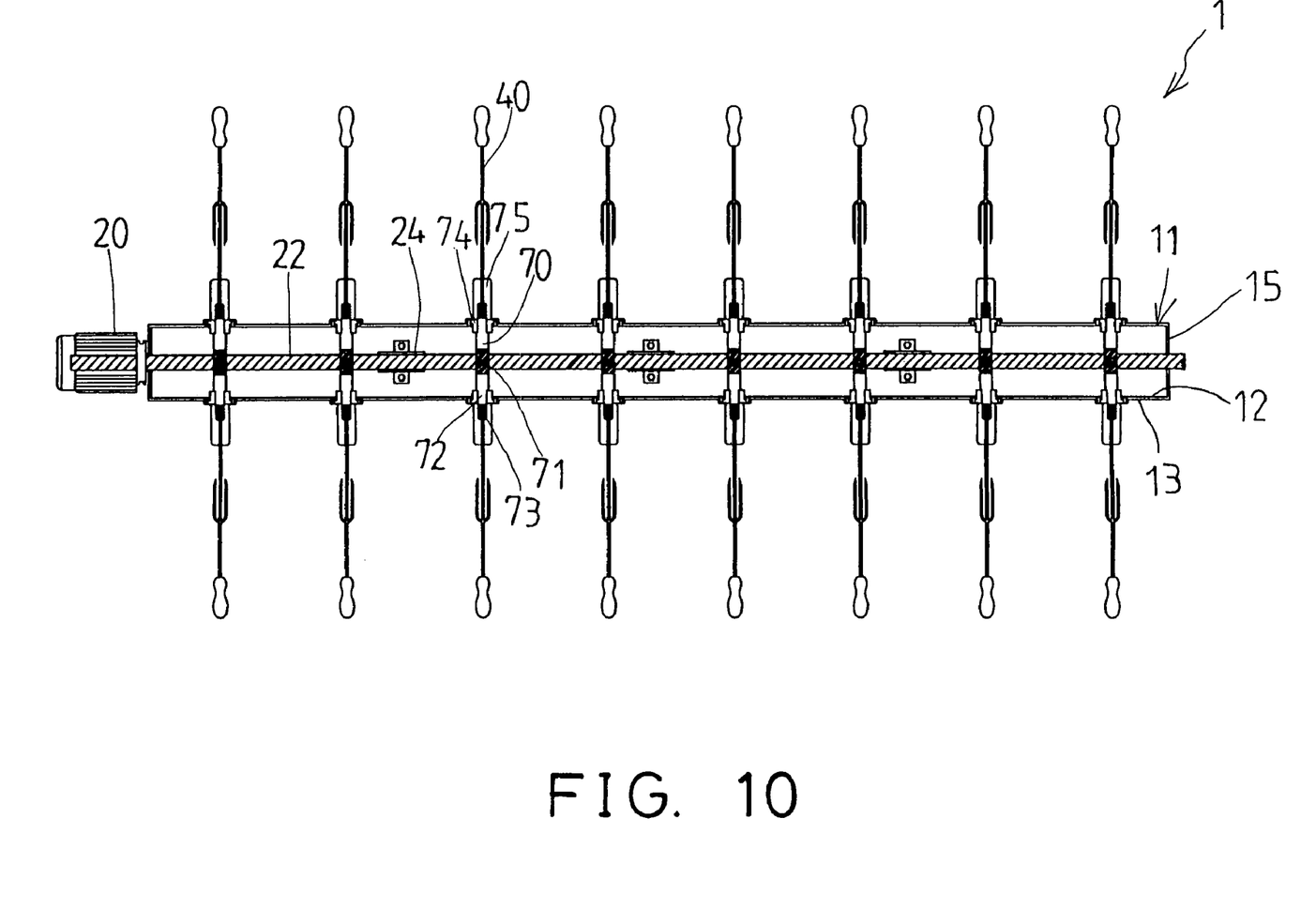
FIG. 10 is a partial top plan view of the barbecue grill device as shown in FIG. 9.

As shown in FIGS. 9 and 10, the shaft 22 may be a threaded shaft 22, and the barbecue grill device 1 may further include one or more rods 70 rotatably disposed or supported on the container 11 and/or the housings 50, and the rods 70 each includes a threaded segment 71 formed or provided thereon, for engaging with the threaded shaft 22, and for allowing the rods 70 to be rotated or driven by the shaft 22. It is preferable that the rods 70 each includes two outer threads 73 formed on the two ends 72 thereof for threading or securing collars or bearings 74 thereto.

The collars or bearings 74 may be rotatably engaged in the orifices 14 of the side walls 13 of the container 11 respectively, and each may include a stud 75 secured thereto, and the stud 75 may include a cavity 76 formed therein, to receive or to attach the mandrel 49 of the fork 41, and thus to attach the forks 41 to the rods 70, and to allow the tools 40 to be rotated or driven by the motor 20 via the threaded shaft 22.

Figure 11:
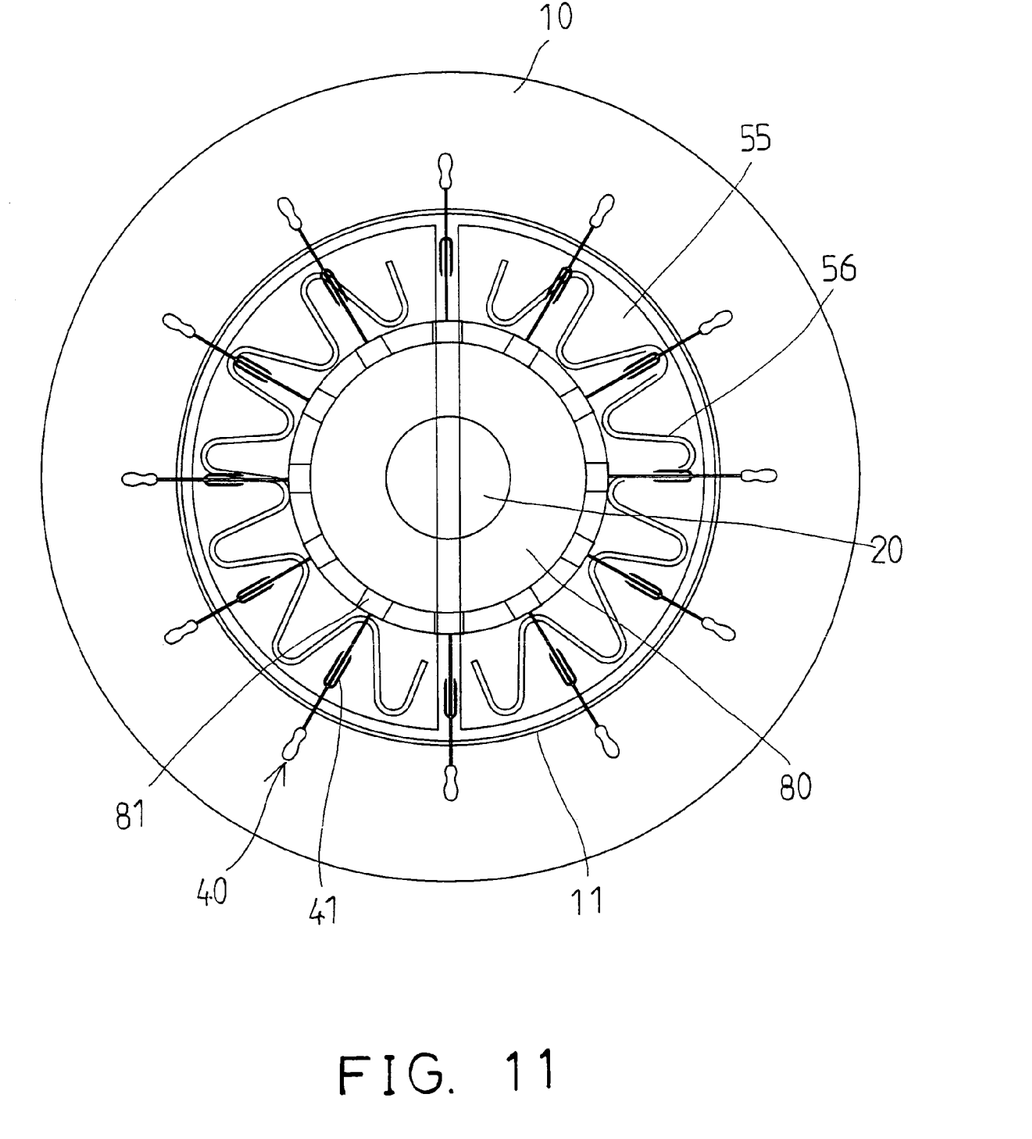
FIG. 11 is a partial top plan view illustrating the further embodiment of the barbecue grill device.

Alternatively, as shown in FIG. 11, the container 11 may be formed into a circular or a cylindrical shape, and the motor 20 may be attached to top of the container 11, and a gear wheel 80 attached or coupled to the motor 20 for being rotated or driven by the motor 20, and a number of pinions 81 are rotatably supported on the container 11, and engaged with the gear wheel 80, so as to be rotated or driven by the motor 20 via the gear wheel 80 and the pinions 81. The barbecue tools 40 may be attached or secured to the pinions 81, and may thus also be rotated or driven by the motor 20 via the gear wheel 80 and the pinions 81.

Accordingly, the barbecue grill device in accordance with the present invention includes rotatable barbecue tools drivable by motor driving members, to turn the food relative to the heat source automatically with motor driving members, and thus to allow the food to be suitably heated or barbecued.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A barbecue grill device comprising:
   a base,
   a container disposed on said base, and including a chamber formed therein,
   at least one housing disposed on said base,
   a platter attached to said at least one housing, for supporting a heat source therein,
   a shaft rotatably attached to said container,
   a motor driving member for driving said shaft to rotate relative to said container,
   at least one axle rotatably attached to said container and engaged with said shaft, so as to be rotated by said motor driving member and said shaft, and
   a barbecue tool for supporting food to be barbecued, said barbecue tool including a mandrel attached to said at least one axle, so as to be rotated by said motor driving member via said shaft and said at least one axle, and
   said at least one housing including two side fences, and a rack secured between said side fences, for engaging with and for supporting said barbecue tool.

2. The barbecue grill device as claimed in claim 1, wherein said at least one housing includes at least one rail attached to each of said side fences thereof, for slidably supporting said platter.

3. The barbecue grill device as claimed in claim 1, wherein said shaft includes at least one bevel gear attached thereto, said at least one axle includes a bevel gear attached thereto and engaged with said at least one bevel gear of said shaft, to allow said at least one axle to be rotated and driven by said motor driving member via said shaft.

4. The barbecue grill device as claimed in claim 1, wherein said container includes a hood attached thereto, for shielding said barbecue tool and the food.

5. The barbecue grill device as claimed in claim 4, wherein said hood includes a heat source attached thereto, for barbecuing the food.

6. The barbecue grill device as claimed in claim 1, wherein said barbecue tool includes a handle attached to said mandrel.

7. The barbecue grill device as claimed in claim 6, wherein said barbecue tool includes a recess formed in said mandrel thereof, said handle includes a passage formed therein to receive said mandrel, and includes a screw hole formed therein and communicating with said passage thereof, and a fastener threaded with said screw hole of said handle, and engageable with said recess of said mandrel, to secure said handle to said mandrel.

8. The barbecue grill device as claimed in claim 7, wherein said handle includes a slot formed therein and communicating with said passage thereof, and a bracket secured to said handle with said fastener and having an arm extended therefrom, and engageable through said slot of said handle and engageable into said recess of said mandrel, to secure and couple said handle to said mandrel.

9. The barbecue grill device as claimed in claim 7, wherein said fastener includes a stud extended therefrom, for engaging into said recess of said mandrel.

10. A barbecue grill device comprising:
    a base,
    a container disposed on said base, and including a chamber formed therein, said container including an air circulating device having a casing disposed on top of said container, and said casing including a plurality of openings formed therein, for smoke discharging purposes,
    at least one housing disposed on said base,
    a platter attached to said at least one housing, for supporting a heat source therein,
    a shaft rotatably attached to said container, 1a motor driving member for driving said shaft to rotate relative to said container,
    at least one axle rotatably attached to said container and engaged with said shaft, so as to be rotated by said motor driving member and said shaft, and
    a barbecue tool for supporting food to be barbecued, said barbecue tool including a mandrel attached to said at least one axle, so as to be rotated by said motor driving member via said shaft and said at least one axle.

11. A barbecue grill device comprising:
    a base,
    a container disposed on said base, and including a chamber formed therein,
    at least one housing disposed on said base,
    a platter attached to said at least one housing, for supporting a heat source therein,
    a shaft rotatably attached to said container, said shaft including an extension extended out of said container, and a grate attached to said extension of said shaft, and rotated in concert with said shaft, for supporting food to be barbecued,
    a motor driving member for driving said shaft to rotate relative to said container,
    at least one axle rotatably attached to said container and engaged with said shaft, so as to be rotated by said motor driving member and said shaft, and
    a barbecue tool for supporting the food to be barbecued, said barbecue tool including a mandrel attached to said at least one axle, so as to be rotated by said motor driving member via said shaft and said at least one axle.

* * * * *